United States Patent [19]
Lim

[11] Patent Number: 5,184,040
[45] Date of Patent: Feb. 2, 1993

[54] ELECTRIC POWER GENERATORS HAVING LIKE NUMBERS OF MAGNETS AND COILS

[76] Inventor: Jong H. Lim, Kumhwa Apt 14-209, Seodaemunku Cheonyeondong, D.P.R. of Korea

[21] Appl. No.: 575,536

[22] Filed: Aug. 30, 1990

[30] Foreign Application Priority Data

Sep. 4, 1989 [KR] Rep. of Korea ............... 1989-12812
Sep. 4, 1989 [KR] Rep. of Korea ............... 1989-12813
Sep. 4, 1989 [KR] Rep. of Korea ............... 1989-12814

[51] Int. Cl.⁵ ............................................. H02K 16/00
[52] U.S. Cl. ................................ 310/114; 310/156; 310/268
[58] Field of Search .............. 310/68 D, 75 C, 114, 310/156, 268

[56] References Cited

U.S. PATENT DOCUMENTS 4,187,441 2/1980 Oney ............................ 310/114
4,358,693 11/1982 Palmer et al. .................. 310/268
4,684,839 8/1987 Fujisaki et al. ................. 310/268
4,761,590 8/1988 Kaszman ....................... 310/156
4,968,913 11/1990 Sakamoto ..................... 310/268
5,039,895 8/1991 Meister ......................... 310/268
5,079,461 1/1992 Schlüter et al. ................ 310/268

FOREIGN PATENT DOCUMENTS 53-26903 3/1978 Japan ............................ 310/114

Primary Examiner—Steven L. Stephan
Assistant Examiner—Matthew Nguyen
Attorney, Agent, or Firm—Darby & Darby

[57] ABSTRACT

An electric power generator comprises several permanent magnet disks including several permanent magnets and several coil disks located between the permanent magnet disks and including several coils, and a line connection circuit for connecting output lines of the coils in parallel.

5 Claims, 7 Drawing Sheets

ELECTRIC POWER GENERATORS HAVING LIKE NUMBERS OF MAGNETS AND COILS

BACKGROUND OF THE INVENTION

This invention relates to an electric power generator.

In general, a conventional electric power generator comprises coils and permanent magnets is shown in FIG. 1. Such a conventional generator however has low efficiency due to reactive power, generated by induced current on the rotor during driving. The reactive power is discharged in an orthogonal direction to the magnetic field applied.

SUMMARY OF THE INVENTION

An object of the present invention is to provide an electric power generator which enhances active power and improves the efficiency of the power generator, and minimizes the generation of heat within the power generator.

The present invention for achieving said object comprises several permanent magnet disks including several permanent magnets and several coil disks located between the permanent magnet disks and including several coils, and line connection means for connecting in parallel output lines of the coils.

DETAILED DESCRIPTION OF THE PREFERRED EMBODIMENTS

Figure 1:
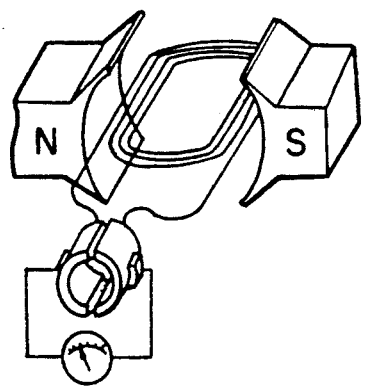
FIG. 1 is a construction diagram of the prior art.
Figure 2:
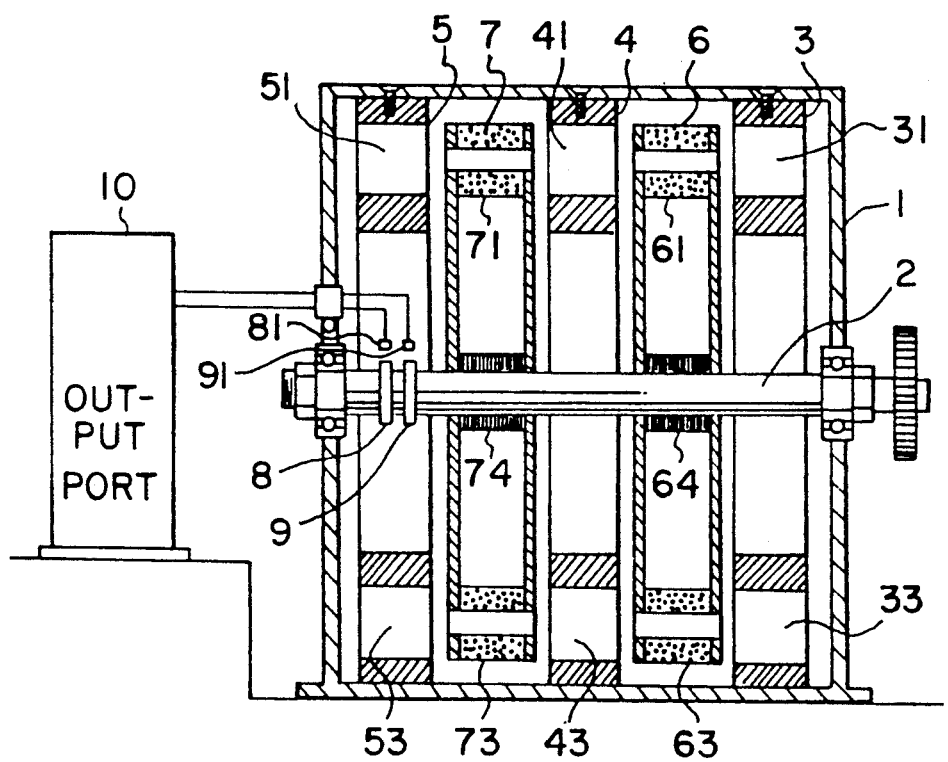
FIG. 2 is a cross-sectional view of an embodiment of the present invention.

FIG. 2 is a cross-sectional view of the preferred embodiment of the present invention, in which can be seen a body case 1, a driving shaft 2, permanent magnet disks 3,4,5, coil disks 6,7, rings 8,9, an output port 10, brushes 81,91, permanent magnets 31,33,41,43,51,53, and coils 61,63,64,71,73,74 wound on cores, respectively.

The permanent magnet disks 3,4,5 are fixed to the body case 1, and the coil disks 6,7 are located between the permanent magnet disks and fixed to the driving shaft 2. The permanent magnet disks 3,4,5 respectively include several permanent magnets like the permanent magnets 31,33,41,43,51,53. The coil disks 6,7 respectively include several coils like the coils 61,63,64,71,73,74.

As the driving shaft 2 and the coil disks 6,7 are rotated, the coils 61,63,64,71,73,74 are passed through magnetic fields formed by the permanent magnets 31,33,41,43,51,53. Accordingly a current is induced through the coils 61,63,64,71,73,74 and is output to the output port 10 through the rings 8,9 and the brushes 81,91.

Figure 3:
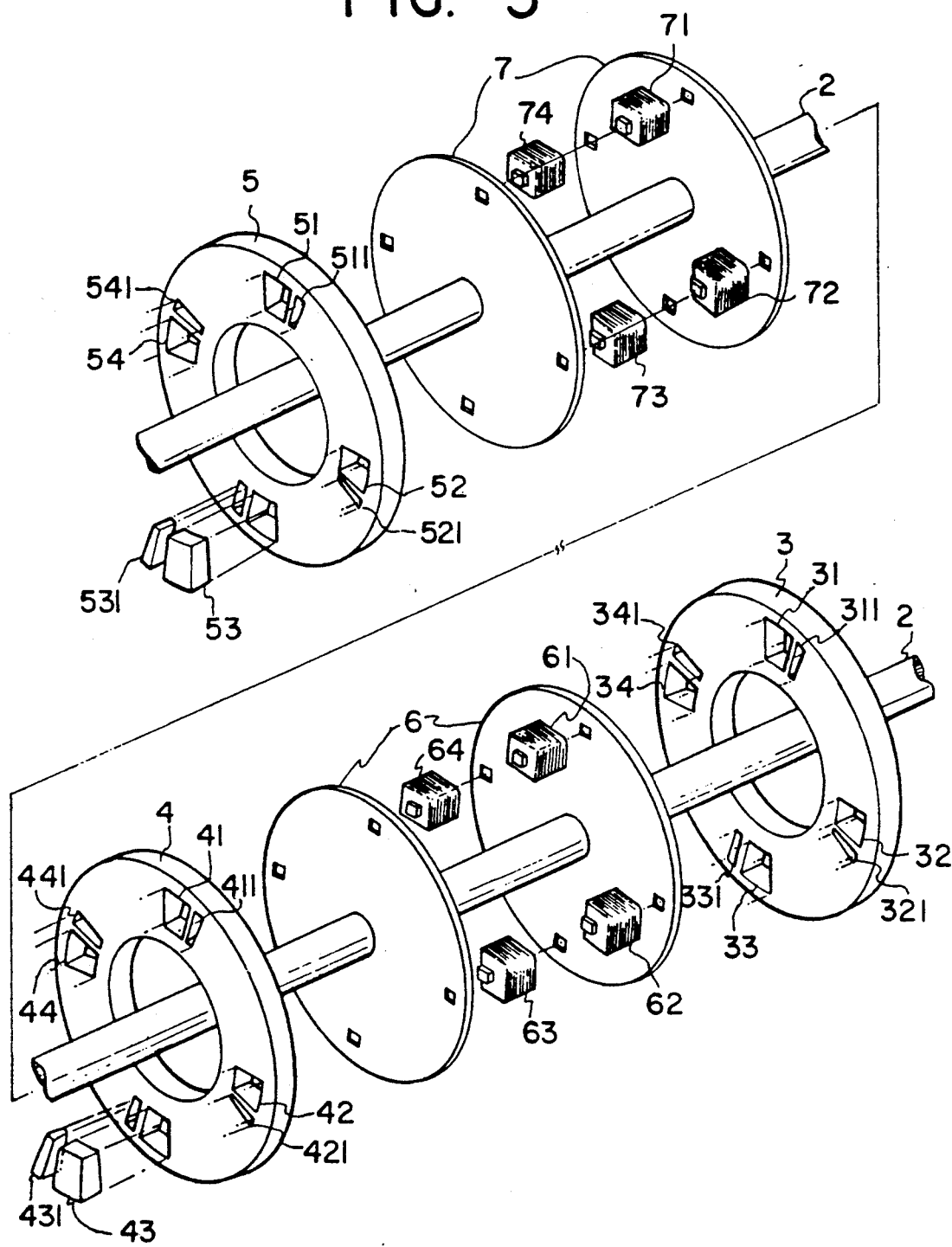
FIG. 3 is a perspective view of important parts of the present invention.

FIG. 3 is a perspective view of important parts of the present invention.

In FIG. 3, like reference numbers to those used in FIG. 2 indicate the same elements, i.e., 32,34,42,44,52,54 show permanent magnets, 61,62,63,64, and 71,72,73,74 coils wound on core, and 311,321,331,341,411,421,431,441,511,521,531, and 541 supplementary permanent magnets, respectively.

In this embodiment, the permanent magnet disks 3,4,5 include four permanent magnets and four supplementary permanent magnets respectively, and the coil disks 6,7 include four coils respectively.

However, the permanent magnet disks 3,4,5 can include more than four permanent magnets. Each permanent magnet on the permanent magnet disks 3,4,5 is located at an interval from the driving shaft 2. Each coil on the coil disks 6,7 is located to pass through the magnetic fields between the permanent magnets.

Each supplementary permanent magnet is formed next to each permanent magnet to enhance the magnetic field intensity.

Each permanent magnet and supplementary permanent magnet respectively are inserted and fixed to a predetermined hole of the permanent magnet disk.

Figure 4:
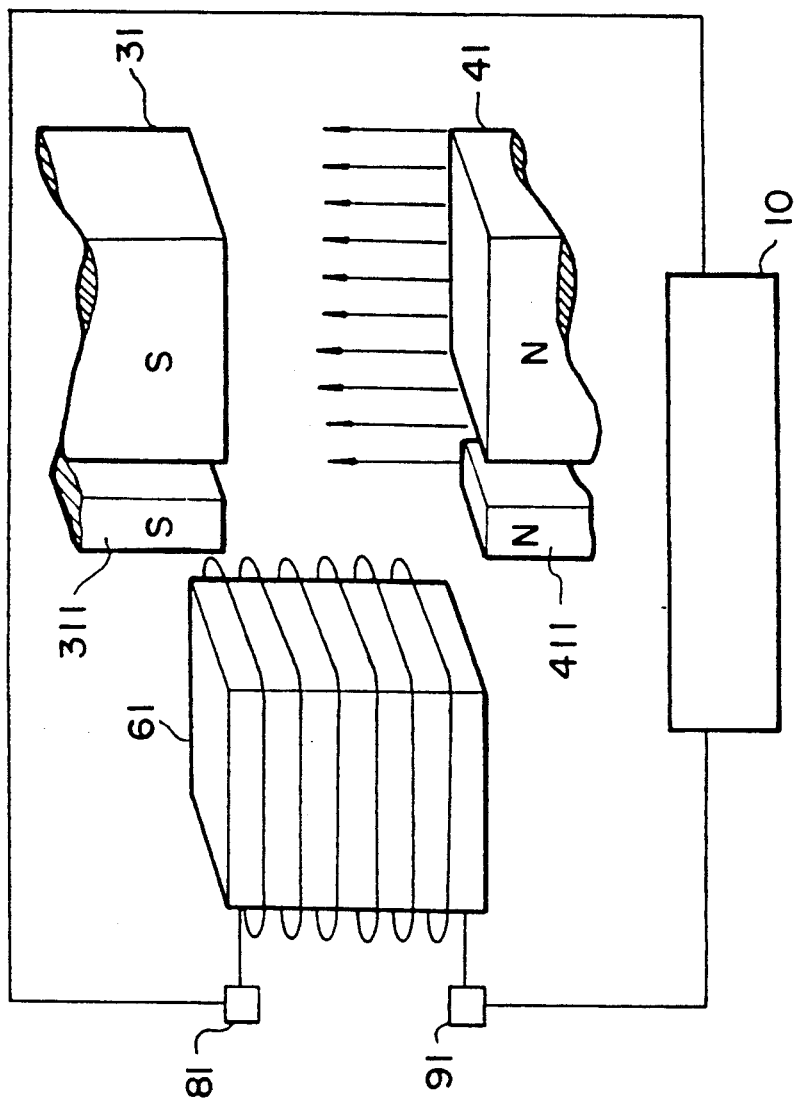
FIG. 4 is a diagram showing a principle of the present invention.

FIG. 4 is a diagram showing a principle of the present invention. Whenever the coils 61 (seen wound on core 68) pass through the magnetic field area between the permanent magnets 31,41, a current is induced in the coils 61 and the current is output to the output port 10. The permanent magnet can be made up of a ferrite permanent magnet, and the supplementary permanent magnet can be made up of a ferrite permanent magnet or an electromagnet.

Figure 5:
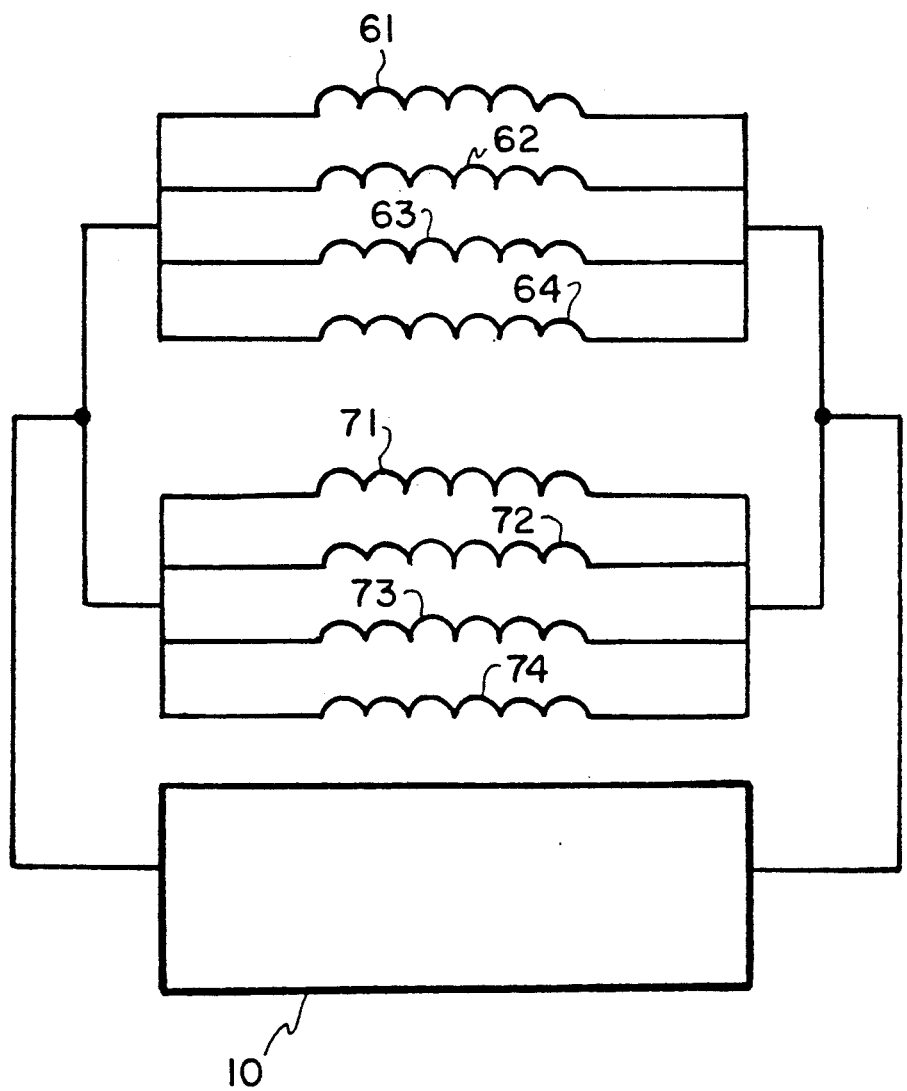
FIG. 5 is a diagram showing a connection of output lines of coils.

FIG. 5 is a diagram showing a connection of output lines of the four coils 61,62,63,64 and 71,72,73,74 on the coil disks 6,7. The four coils 61,62,63,64 on the coil disk 6 are connected in parallel, and the four coils 71,72,73,74 on the coil disk 7 are connected in parallel. Output lines of the four coils 61,62,63,64 and output lines of the four coils 71,72,73,74 are connected in parallel to terminals of the output port 10.

Figure 6:
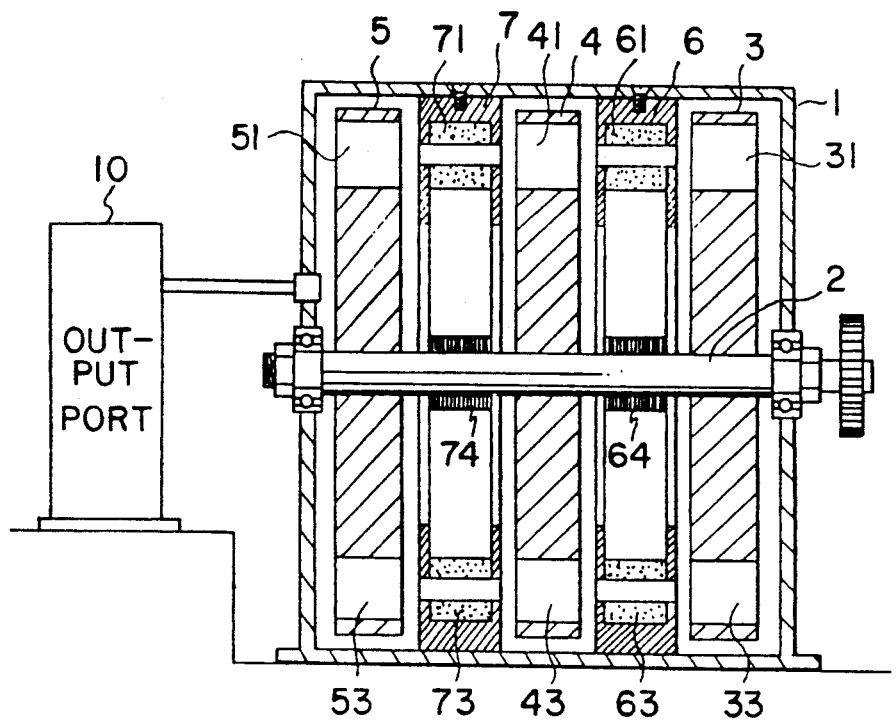
FIG. 6 is a cross-sectional view of another embodiment.

FIG. 6 is a cross-sectional view of another embodiment of the present invention. In this embodiment, coil disks 6,7 are fixed to a body case 1, and permanent magnet disks 3,4,5 are fixed to a driving shaft 2. Accordingly, as the driving shaft 2 is rotated, the permanent magnet disks 3,4,5 are rotated together. Other elements are the same as those shown in FIG. 2.

Figure 7:
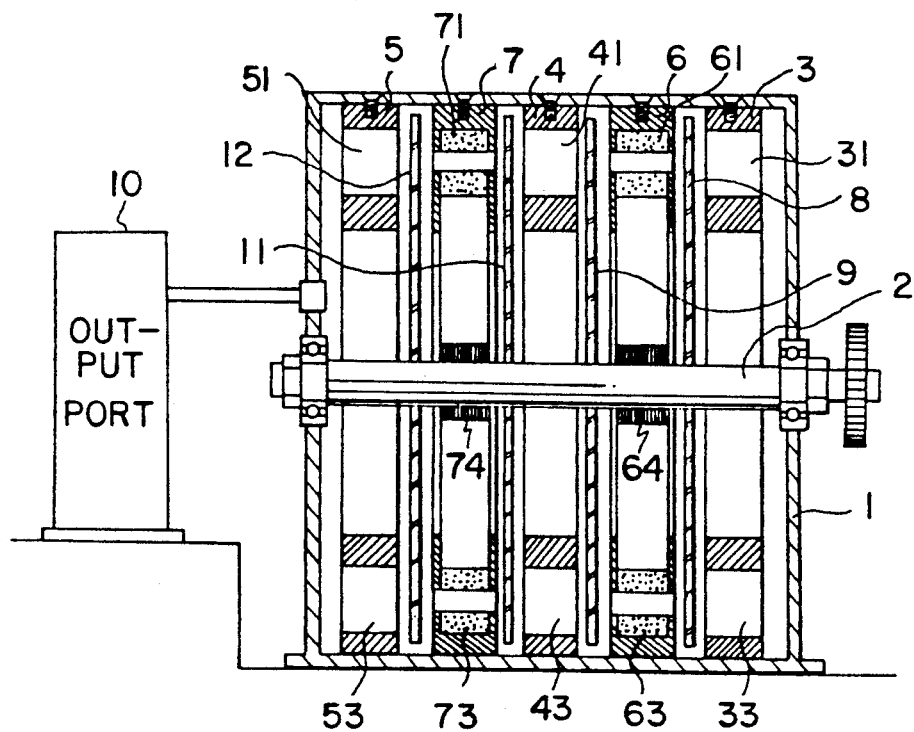
FIG. 7 is a cross-sectional view of another embodiment of the present invention.

FIG. 7 is a cross-sectional view of another embodiment of the present invention. In FIG. 7, rotation disks 8,9,11,12 are fixed to a driving shaft 2, and permanent magnet disks 3,4,5 and coil disks 6,7 are fixed to a body case 1. Accordingly as the driving shaft 2 is rotated, the rotation disks 8,9,11,12 are rotated together, and then this changes the magnetic flux flowing in coils of the coil disks 6,7. Other elements are similar to those shown in FIG. 2.

Figure 8:
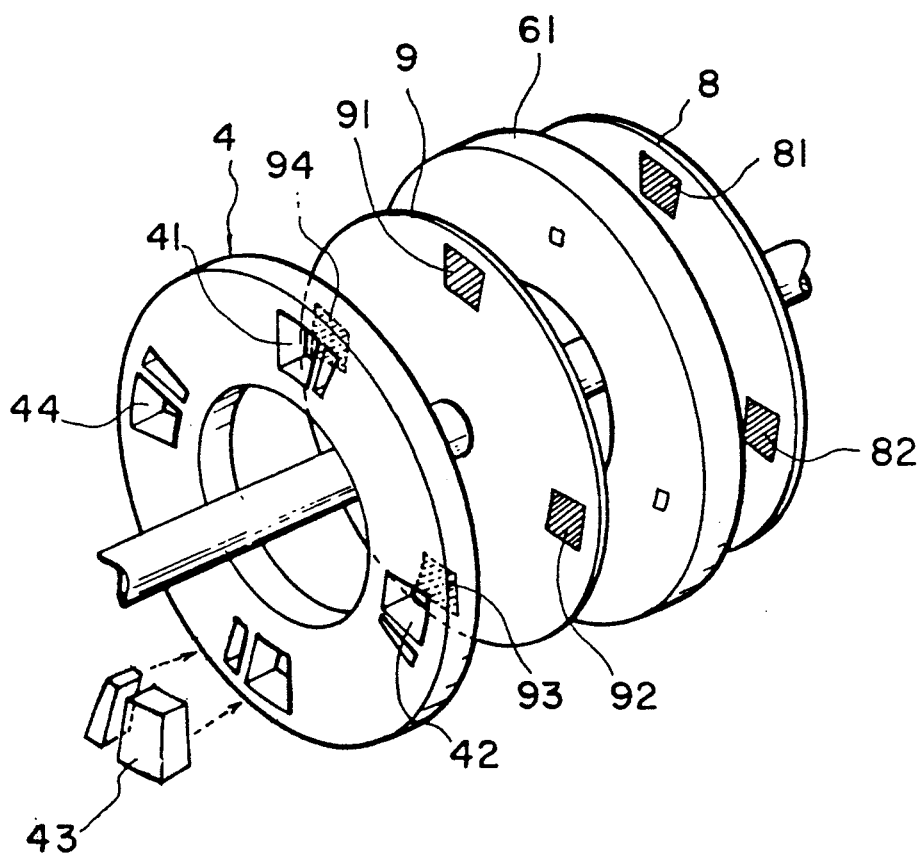
FIG. 8 is a perspective view of important parts of FIG. 7.

FIG. 8 is a perspective view of important parts of FIG. 7. The rotation disks 8,9,11,12 respectively include four magnetic-flux-blocking elements (for example, 81,82,91,92,93,94) blocking the magnetic flux. The magnetic-flux-blocking element can be made up of blocking element of Urethane family. The rotation disks can be made up of ceramic or plastic plate that allow the magnetic flux to flow.

Figure 9:
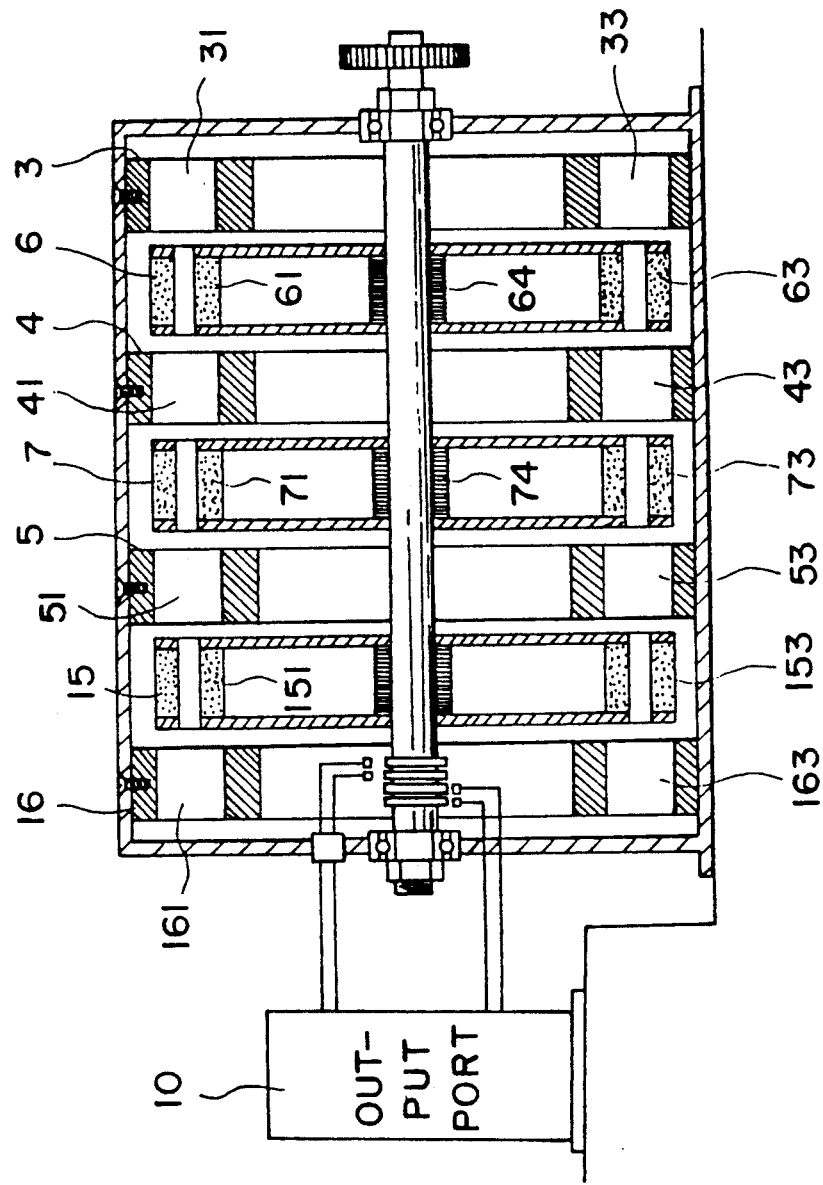
FIG. 9 is a cross-sectional view of another embodiment of the present invention.

FIG. 9 is a cross-sectional view of another embodiment of the present invention. The power generator of FIG. 9 comprises three coil disks 6,7,15 fixed to a driving shaft 2 and four permanent magnet disks 3,4,5,16 fixed to a body case 1 to provide a three phase, four output line type generator. Other parts are similar to those in FIG. 2.

What is claimed is:

1. An electric power generator having a body case comprising:
    a driving shaft;
    a first permanent magnet disk fixed to the body case of the electric power generator and including several permanent magnets and a supplementary permanent magnet associated with each permanent magnet, the magnets being inserted and fixed at a predetermined interval of a given angle for the driving shaft, wherein each supplementary permanent magnet is separated from its associated permanent magnet by a predetermined air gap;
    a second permanent magnet disk fixed to the body case and including several permanent magnets and a supplementary permanent magnet associated with each permanent magnet, the magnets being inserted and fixed at the predetermined interval of a given angle for the driving shaft, wherein each supplementary permanent magnet is separated from its associated permanent magnet by a predetermined air gap;
    a third permanent magnet disk fixed to the body case and including several permanent magnets and a supplementary permanent magnet associated with each permanent magnet, the magnets being inserted and fixed at the predetermined interval of a given angle for the driving shaft, wherein each supplementary permanent magnet is separated from its associated permanent magnet by a predetermined air gap;
    a first coil disk fixed to the driving shaft and located between the first and second permanent magnet disks and including several coils corresponding to the permanent magnets which are inserted and fixed at the predetermined interval of a given angle for the driving shaft;
    a second coil disk fixed to the driving shaft and located between the second and third permanent magnet disks and including several coils corresponding to the permanent magnets which are inserted and fixed at the predetermined interval of a given angle for the driving shaft; and
    line connection means for connecting output lines of the coils in parallel.

2. An electric power generator according to claim 1, wherein each of the first, second and third permanent magnet disks includes four ferrite permanent magnets.

3. An electric power generator according to claim 1, further comprising a fourth permanent magnet disk fixed to the body case and including several permanent magnets and a supplementary permanent magnet associated with each permanent magnet, the magnet being inserted and fixed at a predetermined interval of a given angle for the driving shaft, and a third coil disk fixed to the driving shaft and located between the third and fourth magnet disks and including several coils corresponding to the permanent magnets which are inserted and fixed at the predetermined interval of a given angle for the driving shaft.

4. An electric power generator having a body case comprising
    a driving shaft;
    a first permanent magnet disk fixed to the driving shaft and including several permanent magnets and a supplementary permanent magnet associated with each permanent magnet, the magnets being inserted and fixed at a predetermined interval of a given angle for the driving shaft, wherein each supplementary permanent magnet is separated from its associated permanent magnet by a predetermined air gap;
    a second permanent magnet disk fixed to the driving shaft and including several permanent magnets and a supplementary permanent magnet associated with each permanent magnet, the magnets being inserted and fixed at the predetermined interval of a given angle for the driving shaft, wherein each supplementary permanent magnet is separated from its associated permanent magnet by a predetermined air gap;
    a third permanent magnet disk fixed to the driving shaft and including several permanent magnets and a supplementary permanent magnet associated with each permanent magnet, the magnets being inserted and fixed at the predetermined interval of a given angle for the driving shaft, wherein each supplementary permanent magnet is separated from its associated permanent magnet by a predetermined air gap;
    a first coil disk fixed to the body case of the electric power generator and located between the first and second permanent magnet disks and including several coils corresponding to the permanent magnets which are inserted and fixed at the predetermined interval of a given angle for the driving shaft;
    a second coil disk fixed to the body case and located between the second and third permanent magnet disks and including several coils corresponding to the permanent magnets which are inserted and fixed at the predetermined interval of a given angle for the driving shaft; and
    line connection means for connecting output lines of the coils in parallel.

5. An electric power generator having a body case comprising:
    a driving shaft;
    a first permanent magnet disk fixed to the body case of the generator and including several permanent magnets and a supplementary permanent magnet associated with each permanent magnet, the magnets being inserted and fixed at a predetermined interval of a given angle for the driving shaft, wherein each supplementary permanent magnet is separated from its associated permanent magnet by a predetermined air gap;
    a second permanent magnet disk fixed to the body case and including several permanent magnets and a supplementary permanent magnet associated with each permanent magnet, the magnets being inserted and fixed at the predetermined interval of a given angle of the driving shaft, wherein each supplementary permanent magnet is separated from tis associated permanent magnet by a predetermined air gap;
    a third permanent magnet disk fixed to the body case and including several permanent magnets and a supplementary permanent magnet associated with each permanent magnet, the magnets being inserted and fixed at the predetermined interval of a given angle for the driving shaft, wherein each supplementary permanent magnet is separated from its associated permanent magnet by a predetermined air gap;

a first coil disk fixed to the body case and located between the first and second permanent magnet disks and including several coils corresponding to the permanent magnets which are inserted and fixed at the predetermined interval of a given angle for the driving shaft;

a second coil disk fixed to the body case and located between the second and third permanent magnet disks and including several coils corresponding to the permanent magnets which are inserted and fixed at the predetermined interval of a given angle for the driving shaft;

a first rotation disk fixed to the driving shaft and located between the first permanent magnet disk and the first coil disk and including several magnetic-flux-blocking elements;

a second rotation disk fixed to the driving shaft and located between the second permanent magnet disk and the first coil disk and including several magnetic-flux-blocking elements;

a third rotation disk fixed to the driving shaft and located between the second permanent magnet disk and the second coil disk and including several magnetic-flux-blocking elements;

a fourth rotation disk fixed to the driving shaft and located between the third permanent magnet disk and the second coil disk and including several magnetic-flux-blocking elements; and line connection means for connecting output lines of the coils in parallel.

* * * * *